3,499,050
HYDROGENATION OF CYCLODODECATRIENE TO CYCLODODECENE

Lawrence Wayne Gosser, Wilmington, Del., assignor to E. I. du Pont de Nemours and Company, Wilmington, Del., a corporation of Delaware
No Drawing. Filed Aug. 12, 1968, Ser. No. 751,754
Int. Cl. C07c 5/16, 5/14
U.S. Cl. 260—666                    5 Claims

ABSTRACT OF THE DISCLOSURE 1,5,9-cyclododecatriene can be hydrogenated to cyclododecene in high yield with a catalyst of a nickel halide complexed with a trihydrocarbyl phosphine.

BACKGROUND OF THE INVENTION

This invention relates to a method of making cyclododecene by the hydrogenation of 1,5,9-cyclododecatriene. 1,5,9-cyclododecatriene containing isolated double bonds can be made by the trimerization of butadiene [G. Wilke and M. Kröner Angew. Chem. 71 574 (1959); H. Tokahasi and M. Yamaguchi J. Org. Chem. 28, 1409 (1963)]. The process of the present invention provides a method for partially hydrogenating 1,5,9-cyclododecatriene to cyclododecene, which can be oxidized to dodecanedioic acid [Can. Patent 775,593, U.S. 3,383,398, and Br. Patent 965,510]. Dodecanedioic acid is a valuable chemical useful for the production of polyamide and polyester resins, surface active agents and the like.

SUMMARY OF THE INVENTION

The process of the present invention can be defined as reacting 1,5,9-cyclododecatriene with hydrogen in the presence of a catalytic amount of catalyst having the formula:

$$(R_3P)_2NiX_2$$

wherein R is a hydrocarbyl radical having from 1 to 9 carbon atoms and free of aliphatic unsaturation (i.e., free from ethylenic or acetylenic double bonds) or R is substituted hydrocarbyl comprising an aromatic ring with a substituent of a halogen atom or a lower alkoxyl group and having a total of 6–9 carbon atoms and X is halogen having an atomic number of at least 17, at a temperature of 25 to 250° C. and preferably 150 to 200° C. and recovering cyclododecene from the reaction product.

DETAILED DESCRIPTION OF THE INVENTION

The process of the present invention is a catalytic process for the selective hydrogenation of two of the three non-conjugated double bonds of 1,5,9-cyclododecatriene to form cyclododecene in high yield.

The catalysts are trisubstituted phosphine complexes of nickel halides which are generally soluble in the reaction medium. The substituents R on the phosphorus atoms can be any hydrocarbyl group containing from 1 to 8 carbon atoms including alkyl groups, cycloalkyl groups, aryl groups or aralkyl groups, but should be free of ethylenic or acetylenic unsaturation. In general the R groups are the same for convenience of preparation, but compounds containing mixed R groups are operable and can be used as catalysts in the process of the present invention.

R groups consisting of simple hydrocarbyl radicals include methyl, ethyl, n-propyl, isopropyl, n-butyl, t-butyl, 2-ethylhexyl, n-octyl, 2-methyloctyl, cyclophentyl, cyclohexyl, 4-ethylcyclohexyl, benzyl, 4-methylbenzyl, 3,4-dimethylbenzyl, phenyl, tolyl, 2,4-dimethylphenyl, 2,4,5-trimethylphenyl, 4-n-propylphenyl and the like. R groups consisting of aromatic radicals with a halogen or alkoxy substituent include 4-fluorophenyl, 4-chlorophenyl, 4-bromophenyl, 4-iodophenyl, 3-chlorophenyl, 3-chloro-4-methylphenyl, 3-propyl-4-fluorophenyl, 3,5-dimethyl-4-bromophenyl, 4-bromobenzyl, 3-methyl-4-chlorobenzyl, 4-methoxyphenyl, 4-ethoxybenzyl, 3-methoxy-4-methylphenyl and the like.

The halogen atoms, X, attached to nickel in the catalyst can be chlorine, bromine or iodine, i.e., a halogen with an atomic number of at least 17. The yield of product, other things being equal, increases substantially with the atomic number of the halogen, and accordingly the iodides are particularly preferred as catalysts. When R groups containing halogen are present, the halogen substituent can be fluorine, chlorine, bromine, or iodine.

The pressure at which the reaction is performed is not critical and can be from atmospheric pressure to at least 1000 atmospheres. Suitable pressures are from 40 to 150 atmospheres.

Temperature is not highly critical and the reaction can be accomplished at temperatures between 25 and 250° C., although the highest yields are obtained at temperatures of 150 to 200° C. and accordingly 150 to 200° C. is preferred.

The reaction can be accomplished in the absence of any diluent, but the 1,5,9-cyclododecatriene can be diluted with a solvent inert to the catalyst and the reactants if desired. Suitable solvents include benzene and benzene substituted with one or more lower alkyl groups, such as toluene, xylenes or ethylbenzene. Mixtures of solvents can be employed if desired. In general the triene should be present in a concentration of from 1% to 100% by weight in the solution. Sufficient catalyst to catalyze the reaction must be used, but the amount is not critical. In general, there should be 0.004 to 10 gms. of catalyst per ml. of triene and preferably 0.02 to 1 gm. of catalyst per ml. of triene. When solutions are employed there should be 0.2 to 50 gms. of catalyst per 100 ml. of solution and preferably from 1 to 10 gms. of catalyst per 100 ml. of solution.

The reaction of the present invention should be conducted in substantially anhydrous conditions.

PREPARATION OF THE CATALYSTS

The preparation of bis(triphenylphosphine)nickel dihalides is described by L. M. Venanzi, J. Chem. Soc. 719 (1958). The preparation of other typical catalysts containing aryl groups is as follows.

Warm n-butanol solutions containing approximately stoichiometric amounts of nickel iodide and the appropriate phosphine are mixed in a nitrogen atmosphere. The crystals which separate are collected and washed with n-butanol and then with pentane or petroleum ether. The crystals are dried at 90–120° C. for one hour under vacuum:

|  | Color | Melting Point |
| --- | --- | --- |
| [(p-ClC$_6$H$_4$)$_3$P]$_2$NiI$_2$ | Red brown | 145–155 |
| [(p-CH$_3$C$_6$H$_4$)$_3$P]$_2$NiI$_2$ | Dark | 244–247 |
| [(C$_6$H$_5$CH$_2$)$_3$P]$_2$NiI$_2$ | Dark brown | 123–127 |

The preparation of bis(trioctylphosphine)nickel diiodide can be accomplished by mixing approximately stoichiometric amounts of solutions of triethylphosphine and anhydrous nickel iodide in absolute ethanol under a nitrogen atmosphere. On mixing, a green oil separates which can be recovered with a rotary evaporator at 40° C. and about 0.2 mm. Hg to leave a very dark green pentane soluble oil.

Other phosphine complexes of nickel halides can be prepared by similar methods.

This invention is further illustrated by the following examples which are not, however, intended to fully delineate the scope of this discovery.

Examples 1-50

The following examples, with the exception of Example 19 were performed using the following procedure, the specific conditions in which relate to Example 4.

Example 4

Bis-(triphenylphosphine)nickel diiodide (1.0 g.) and 25 ml. of 1,5,9-cyclododecatriene were placed in a metal reactor lined with Hastelloy-C. The closed reactor was cooled in a Dry Ice bath and evacuated to about 1 mm. Hg. Hydrogen was then admitted to a pressure of a few hundred p.s.i. and the reactor was heated to 175° C. The hydrogen pressure was increased to 1200 p.s.i. and maintained at or near 1200 p.s.i. and the reactor was agitated for six hours. It was then cooled to room temperature, vented, and the reaction mixture was poured out. The reactor was rinsed with 50 ml. benzene. The rinse and the reaction mixture were filtered through a glass frit (less than 0.02 g. solid collected) and the benzene was removed from the combined filtrates at 25 to 80° C. and 100 to 200 mm. Hg using a rotary evaporator. The flask containing the resulting mixture was then fitted with a simple distillation head and 20.1 g. of distillate, B.P. ~67° C. at 1.3 mm. Hg was collected (final still pot temp. 155° C.) leaving 0.5 g. of reddish brown semisolid residue.

The distillate was shown to be almost entirely a mixture of cyclododecenes by the following analytical data:

Infrared spectrum: matched that of cyclododecene.

Refractive index: $n_D^{25.5}$ 1.4832 ($n_D^{24.7}$ 1.4824 for cyclododecene and $n_D^{20}$ 1.5070 for 1,5,9-cyclododecatriene).

Nuclear magnetic resonance: The spectrum was generally very similar to that of cyclododecene. The ratio of total peak area from protons on saturated carbon atoms to that from protons on olefinic carbon atoms was 12. (Theoretical values are: cyclododecatriene, 2; cyclododecadiene, 4; cyclododecene, 10; cyclododecane, ∞.

Gas chromatographic analysis: Peaks were found at the retention times of cyclododecane, cyclodecenes and 1,5,9-cyclododecatriene with relative areas 6.2, 93.5 and 0.5 respectively.

Example 19 employed the following procedure:

Example 19

A solution of 1.0 ml. of 1,5,9-cyclododecatriene and 0.60 g. of solid bis(triphenylphosphine)nickel diiodide in 35 ml. of benzene was placed in a reactor lined with Hastelloy-C. The closed reactor was cooled in a Dry Ice bath and evacuated to about 1 mm. Hg. Hydrogen was then admitted to a pressure of a few hundred p.s.i. and then the reactor was heated to 100° C. The hydrogen pressure was then maintained at 950 to 2550 p.s.i. and the reactor was agitated for six hours. It was then cooled to room temperature, vented and the reaction mixture was poured out. The benzene was removed using a rotary evaporator leaving a light liquid over a deep red-black oil. The liquid was removed and distilled yielding 0.75 g. of distillate, B.P. ~64° C. at 0.3 mm. Hg. Gas chromatography of this distillate indicated its composition to be cyclododecane <0.5%, cyclododecene 62%, cyclododecatriene 6%, with 32% at a retention time intermediate between those of monoene and triene. The latter material is presumed to be cyclododecadienes. This analysis is supported by the refractive index, $n_D^{25.7}$ 1.4919 (monoene $n_D^{24.7}$ 1.4824, triene $n_D^{20}$ 1.5070) and by the NMR spectrum. The ratio of total peak area from protons on saturated carbon atoms to that from protons on olefinic carbon atoms was 5, a value intermediate between the theoretical value of 2 for the triene and 10 for the monoene.

The specific conditions and results obtained for each example are given in the accompanying Table I.

TABLE I.—Continued

| | Catalyst | CDDT[1], grams | Solvent | Ml. | Time, hrs. | Temp., °C. | H₂ pressure, p.s.i.g. | Product, grams | Refractive index/°C., n_D | NMR integration ratio, olefin H/sat'd H | Cyclodo-decane, percent | Cyclododecenes Percent | Percent Trans/percent Cis | t,t,t-CDDT[2] plus dienes, percent | t,t,c-CDDT[3], percent | Unknown |
|---|---|---|---|---|---|---|---|---|---|---|---|---|---|---|---|---|
| 24 | [(C₆H₅)₃P]₂NiI₂[4] | 1.0 | C₆H₆ | 20 | 6 | 200 | 1,200 | 15.9 | 1.4829/24.7 | 0.060 | 22 | 78 | | | | |
| 25 | [(C₆H₅)₃P]₂NiI₂ | 1.0 | C₆H₆ | 25 | 6 | 200 | 1,200 | 21.0 | 1.4833/24.5 | 0.055 | 21 | 79 | | | | |
| 26 | [(C₆H₅)₃P]₂NiI₂[4] | 0.50 | C₆H₆ | 30 | 6 | 175 | 1,220 | 1.7 | 1.4872/24.7 | 0.097 | 3.6 | 87.5 | | 4.4 | 3.0 | 1 |
| 27 | [(C₆H₅)₃P]₂NiI₂[4] | 1.0 | C₆H₆ | 20 | 6 | 160 | 1,200 | 16.45 | 1.4868/24.8 | 0.11 | 0.6 | 89.5 | | 4.4 | 0.9 | |
| 28 | [(C₆H₅)₃P]₂NiI₂ | 1.0 | C₆H₆ | 25 | 6 | 175 | 1,200 | 21.7 | 1.4870/25.0 | 0.099 | 0.2 | 93 | | 4.1 | 1 | |
| 29 | [(C₆H₅)₃P]₂NiI₂ | 1.0 | C₆H₆ | 28 | 6 | 185 | 1,200 | 22.2 | 1.4857/25.5 | 0.093 | 3.5 | 93 | | 4.6 | (⁹) | 2.5 |
| 30 | [(C₆H₅)₃P]₂NiI₂[6] | 1.0 | C₆H₆ | 25 | 6 | 185 | 1,200 | 20.4 | 1.4991/25.5 | 0.27 | 2 | 25 | | 45 | 26 | |
| 31 | [(C₆H₅)₃P]₂NiI₂ | 1.0 | C₆H₆ | 26.4 | 6 | 175 | 450 | 21.7 | 1.4883/25.5 | 0.12 | 2 | 85 | | 11 | 3 | |
| 32 | [(C₆H₅)₃P]₂NiI₂[7] | 0.1 | C₆H₆ | 25 | 6 | 175 | 190 | 19.5 | 1.5042/28.5 | 0.47 | | <1 | | 2 | 98 | |
| 33 | [(C₆H₅)₃P]₂NiI₂ | 0.60 | C₆H₆ | 15 | 7 | 175 | 1,200 | 11.6 | 1.4848/25.0 | 0.071 | 8 | 92 | | | | |
| 34 | [(C₆H₅)₃P]₂NiI₂ | 0.1 | C₆H₆ | [5]10 | 6 | 185 | 1,200 | 9.0 | 1.4833/25.7 | 0.072 | 14 | 86 | 1.40 | | | |
| 35 | [(C₆H₅)₃P]₂NiI₂ | 0.10 | C₆H₆ | 25 | 6 | 185 | 1,250 | 19.9 | 1.5068/25.7 | 0.51 | | | | 3 | 97 | |
| 36 | [(C₆H₅)₃P]₂NiI₂ | 0.60 | CH₂Cl₂ | 35 | 6 | 100 | 700 | 0.74 | 1.4953/25.7 | 0.46 | <0.5 | 1 | | 7 | 92 | |
| 37 | [(C₆H₅)₃P]₂NiCl₂ | 0.50 | C₆H₆ | 2 | 6 | 185 | 1,250 | 1.6 | 1.5035/25.3 | 0.23 | 2 | 36 | | 42 | 14 | 4 |
| 38 | [(C₆H₅)₃P]₂NiCl₂ | 0.50 | C₆H₆ | 2 | 6 | 150 | 1,200 | 1.5 | 1.5035/25.0 | 0.42 | 0.5 | 5 | | 22 | 68 | 4 |
| 39 | [(C₆H₅)₃P]₂NiCl₂ | 0.50 | C₆H₆ | 2 | 6 | 150 | 1,200 | 1.5 | 1.4902/25.0 | 0.43 | 1.0 | 5 | | 33 | 46 | 14 |
| 40 | [(C₆H₅)₃P]₂NiBr₂ | 0.50 | C₆H₆ | 2 | 6 | 175 | 1,200 | 1.5 | 1.4950/25.0 | 0.14 | 3 | 69 | | 22 | 5 | 1 |
| 41 | [(n-C₄H₉)₃P]₂NiBr₂ | 0.50 | C₆H₆ | 2 | 6 | 150 | 1,200 | 1.5 | 1.4891/25.6 | 0.21 | 4 | 43 | | 40 | 10 | 3 |
| 42 | [(n-C₄H₉)₃P]₂NiBr₂ | 0.50 | C₆H₆ | 2 | 6 | 150 | 1,200 | 1.4 | 1.4965/25.2 | 0.15 | 2 | 71 | 0.25 | 23 | 4 | |
| 43 | [(n-C₄H₉)₃P]₂NiBr₂ | 0.50 | C₆H₆ | 2 | 6 | 225 | 1,200 | 1.5 | 1.4874/25.6 | 0.27 | 1 | 36 | 0.88 | 45 | 14 | |
| 44 | [(C₆H₅)₃P]₂NiBr₂ | 0.50 | C₆H₆ | 2 | 6 | 175 | 1,200 | 1.6 | 1.4861/22 | 0.084 | 10 | 43 | | | 8 | 39 |
| 45 | [(C₆H₅)₃P]₂NiI₂ | 0.30 | C₆H₆ | 10 | 6 | 175 | 1,200 | 6.2 | 1.4857/22 | 0.120 | 0.1 | 91 | 1.6 | | (¹⁰) | 4 |
| 46 | [P-CH₃C₆H₄)₃P]₂NiI₂ | 0.30 | C₆H₆ | 10 | 6 | 175 | 1,200 | 6.3 | 1.4952/24 | 0.102 | 0.4 | 92 | 1.9 | | 4 | |
| 47 | [P-Cl-C₆H₄)₃P]₂NiI₂ | 0.30 | C₆H₆ | 10 | 6 | 200 | 1,200 | 5.7 | 1.4881/26 | 0.270 | 1.2 | 33.8 | 0.59 | 11 | 17.9 | 2.2 |
| 48 | [P-Cl-C₆H₄)₃P]₂NiI₂ | 0.50 | C₆H₆ | 10 | 6 | 175 | 1,200 | 7.8 | 1.4839/25 | 0.105 | 5.1 | 79.4 | 1.2 | 44.2 | (¹¹) | |
| 49 | [(C₆H₁₁)₃P]₂NiI₂ | 1.0 | | | 12 | 175 | 1,200 | 7.0 | 1.4839/25 | 0.096 | 1.2 | 96 | 2.2 | | 1.6 | |
| 50 | [(C₆H₁₁)₃P]₂NiI₂ | 0.50 | | | 6 | 175 | 1,200 | 6.0 | 1.4849/25 | 0.095 | 2 | 94 | 2.0 | | 6 | |

[1] CDDT-trans,trans,cis-1,5,9-cyclododecatriene from Aldrich Chem. Co., except as indicated.
[2] t,t,t-CDDT-trans,trans,trans-1,5,9-cyclododecatriene.
[3] t,t,c-CDDT-trans,trans,cis-1,5,9-cyclodecatriene.
[4] In these runs the catalyst was not dried and contained 10-15% water by weight.
[5] Aldrich trans,trans,cis-triene.
[6] Du Pont trans,trans,cis-triene.
[7] Aldrich triene containing 21.7% trans,trans,trans,triene.
[8] Diene plus triene 1.9.
[9] Diene plus triene 3.5.
[10] Diene plus triene 8.
[11] Diene plus triene 15.5.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for hydrogenating 1,5,9-cyclododecatriene to cyclododecene which comprises contacting 1,5,9-cyclododecatriene with hydrogen in the presence of a catalytic amount of a catalyst having the formula $$(R_3P)_2NiX_2$$

wherein R is a hydrocarbyl radical of 1 to 9 carbon atoms free of aliphatic unsaturation or R is a substituted hydrocarbyl free of aliphatic unsaturation, said substituted hydrocarbyl group comprising an aromatic ring with a substituent of a halogen atom or a lower alkoxyl group and having a total of 6-9 carbon atoms, and X is halogen having an atomic number of at least 17 at a temperature of 25 to 250° C., and recovering cyclododecene from the product of the reaction.

2. Process of claim 1 in which the temperature is from 150 to 200° C.

3. Process of claim 1 in which the pressure is from 1 to 1000 atmospheres.

4. Process of claim 3 in which X is iodine.

5. Process of claim 4 in which R is phenyl.

References Cited

UNITED STATES PATENTS

| 3,022,359 | 2/1962 | Wieze. |
| 3,182,093 | 5/1965 | Wellman. |
| 3,294,853 | 12/1966 | Arrigo. |
| 3,308,177 | 3/1967 | Atkins. |
| 3,369,052 | 2/1968 | Howell. |

DELBERT E. GANTZ, Primary Examiner

V. O'KEEFE, Assistant Examiner